Feb. 15, 1938. R. C. LASSIAT 2,108,069
STRUCTURE AND ASSEMBLY OF CONVERTERS
Filed Oct. 23, 1935 4 Sheets-Sheet 1

INVENTOR
RAYMOND C. LASSIAT.
BY
Ira L. Nickerson
ATTORNEY

INVENTOR
RAYMOND C. LASSIAT.
BY
Ira L. Nickerson
ATTORNEY

Feb. 15, 1938. R. C. LASSIAT 2,108,069
STRUCTURE AND ASSEMBLY OF CONVERTERS
Filed Oct. 23, 1935 4 Sheets-Sheet 3
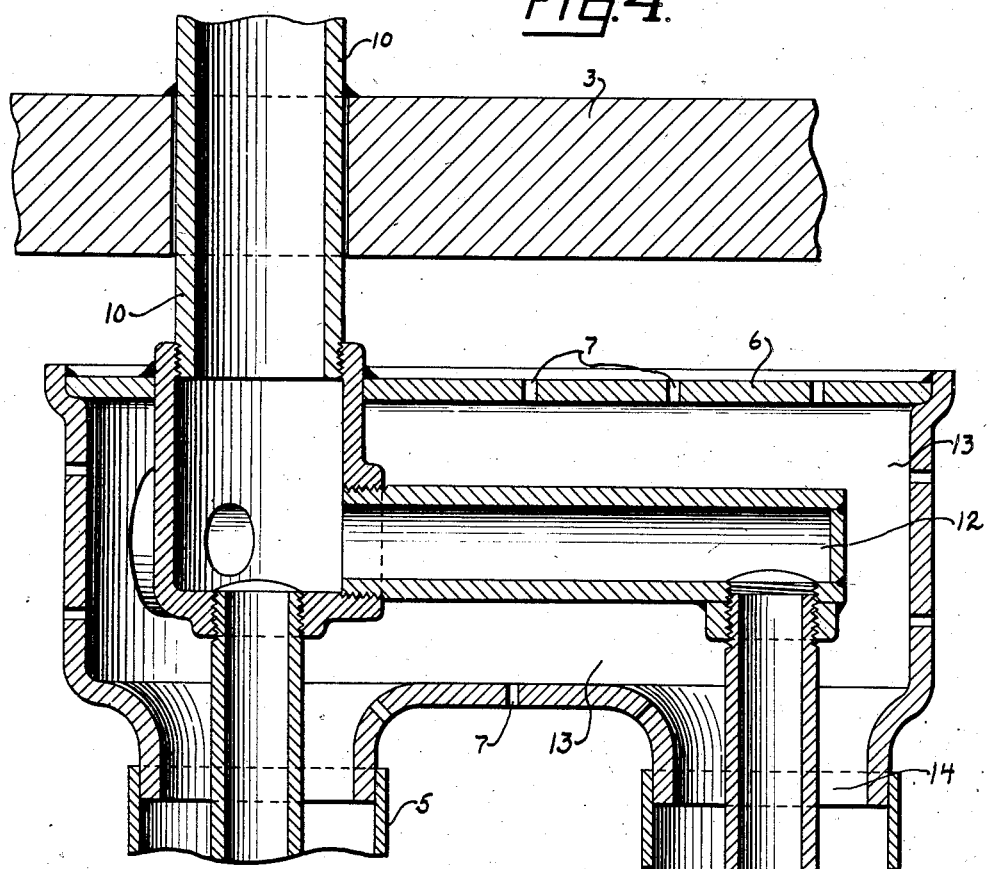
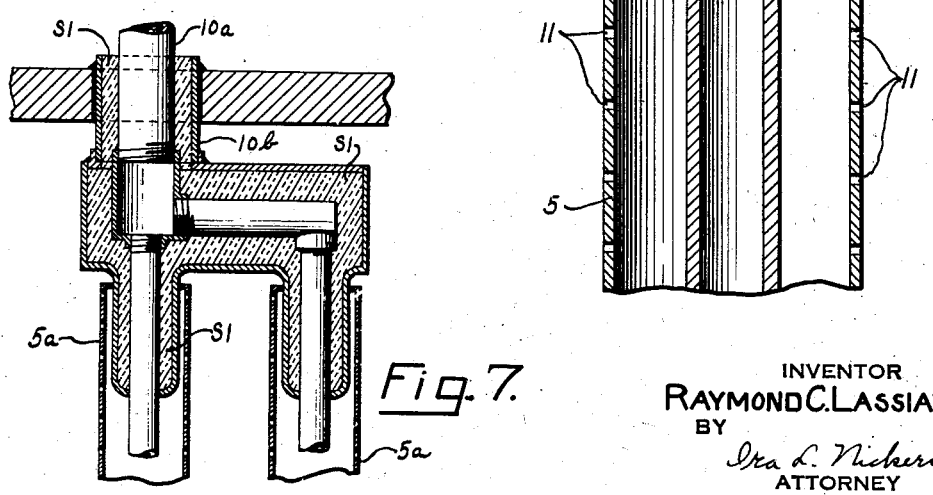
INVENTOR
RAYMOND C. LASSIAT.
BY
*Ira L. Nickerson*
ATTORNEY Feb. 15, 1938.　　　R. C. LASSIAT　　　2,108,069
STRUCTURE AND ASSEMBLY OF CONVERTERS
Filed Oct. 23, 1935　　　4 Sheets-Sheet 4

INVENTOR
RAYMOND C. LASSIAT.
BY
Ira L. Nickerson
ATTORNEY

Patented Feb. 15, 1938

2,108,069

UNITED STATES PATENT OFFICE 2,108,069

STRUCTURE AND ASSEMBLY OF CONVERTERS

Raymond C. Lassiat, Woodbury, N. J., assignor to Houdry Process Corporation, Dover, Del., a corporation of Delaware Application October 23, 1935, Serial No. 46,354

13 Claims. (Cl. 23—288)

The present invention relates to apparatus and method of assembly thereof, for example, apparatus such as is employed in effecting fluid contacting operations or chemical reactions, and especially to apparatus wherein a number of tubes or conduits are arranged within a reaction chamber. It is particularly concerned with the arrangement and assembly of conduits in a converter, of the general type of that illustrated in Fig. 1 of U. S. Patent No. 1,992,946, issued to J. W. Harrison on March 5, 1935, or equivalent or related constructions, wherein conduits must be assembled within a case and mounted in predetermined fixed relation. Usually such a converter or reaction chamber will contain a catalyst or contact mass between the spaced conduits. The contact mass may be inert or active, or porous or non-porous, depending upon the reaction to be carried out.

In the past, conduits, including distributing and collecting conduits, have been arranged in a number of patterns, such as the square pattern shown in Fig. 2 of the above identified patent, or the hexagonal one shown in Fig. 3 of said patent and in Fig. 2 of U. S. Patent No. 1,987,905, issued to Eugene J. Houdry on January 15, 1935. However, so far as I am aware, in all of the assemblies thus far developed or proposed, each of the conduits individually communicates with its respective supply or withdrawal manifold through a tube sheet, or equivalent, which bounds the reaction zone or the like. Such a type of assembly requires, for example, that each conduit be screwed into, welded to or otherwise affixed to a tube sheet, or the like, which usually is also made to support the weight of the tubes or conduits. In such an assembly, where the conduits are of substantial size and in closely spaced relation, as is illustrated, for example, in the copending application of Eugene J. Houdry, Serial No. 33,503, filed July 27, 1935, the necessary openings in the tube sheet tend to weaken the same. Because of this result, the mounting of both inlet and withdrawal conduits in a single tube sheet at one end of a converter, even where desirable, has presented difficulties, for example, in the way of sacrifice of considerable strength where the conduits were in very closely spaced relation.

It is an object of this invention to minimize the number of openings or mountings necessary in a tube sheet for a given number of conduits. It is a further object of this invention to provide a converter structure which is durable and can be expeditiously assembled. Other objects include providing a converter structure wherein both the inlet and outlet conduits may be mounted on a single tube sheet, if desired, and wherein conduits may be introduced into the converter through a manhole, or the like, and mounted therein while both tube sheets are in place.

Other objects and advantages, as well as a quick understanding of the invention, can best be learned by reference to the accompanying drawings in which Fig. 1 is a sectional elevational view of the converter shown in Fig. 2, with a part of the conduits in place and one group in the course of introduction;

Fig. 4 is an enlarged sectional detail of one of the Y manifolding units, with appurtenant connections, taken on line 3—3 of one of the units shown in Fig. 2, the left hand portion of the unit being broken away;

Fig. 7 is a modification in reduced size of the unit shown in Fig. 4.

Figure 1:
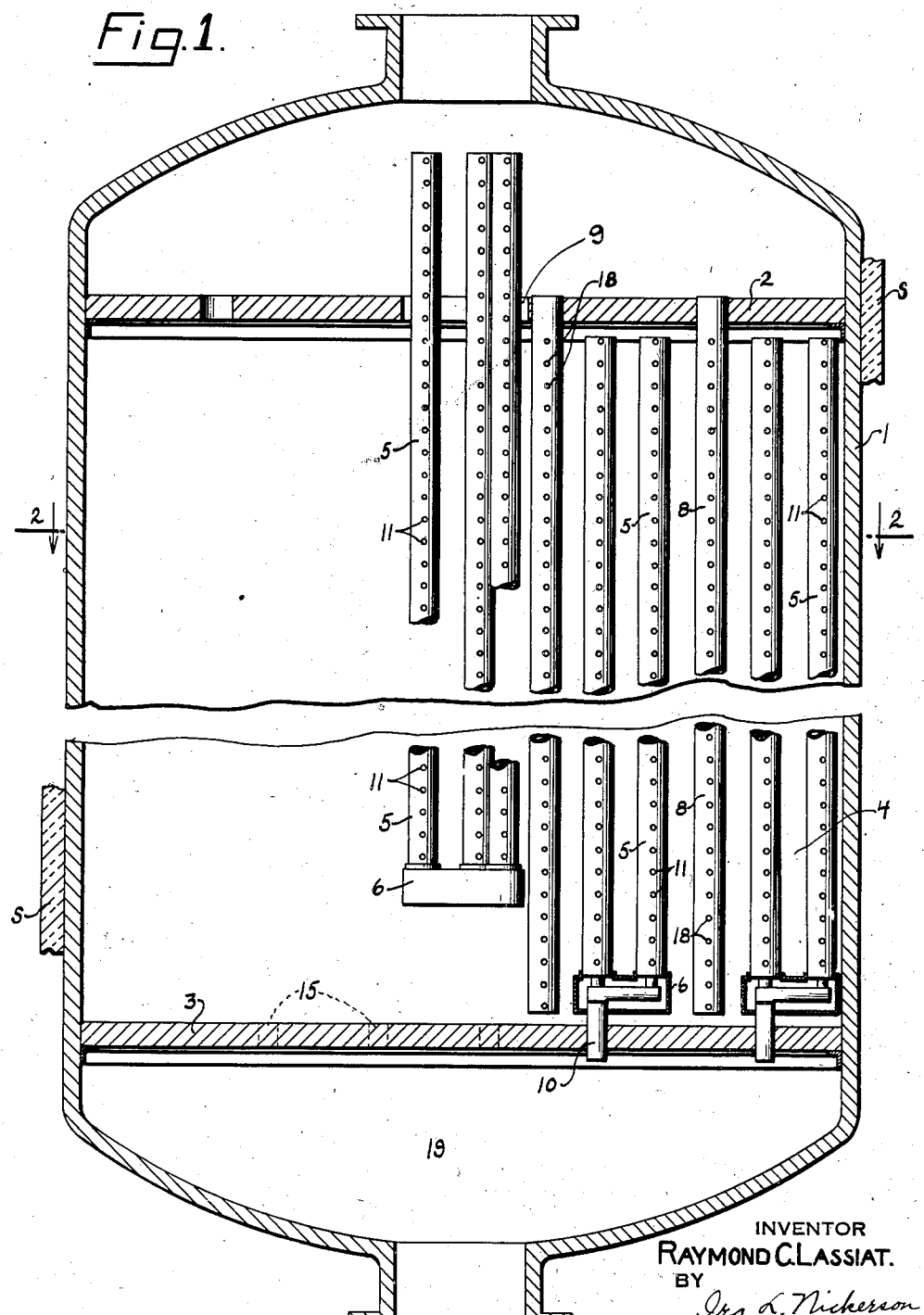

Referring more in detail to the drawings, in the several figures of which like reference characters denote similar parts, 1 is a converter having upper tube sheet 2 and lower tube sheet 3 mounted therein and forming the upper and lower boundaries of reaction chamber 4. Insulation S surrounds the converter. The reaction chamber is fed with fluids, including various reactants or regeneration media, as the case may be, through conduits 5 having perforations 11. The conduits, in turn, are supplied in groups by respective manifolds 6 which communicate through tube sheet 3 with manifolding chamber 19. Fluids, including products of reaction or regeneration, are vented from the reaction chamber 4 through conduits 8 which are individually mounted in upper tube sheet 2 and have perforations 18 therein. The spaces between conduits 5 and 8 within the reaction chamber may be filled with a contact mass, omitted from the drawings for the sake of clarity. The groups of conduits and/or individual conduits may be introduced into the reaction chamber through opening 9 in the wall or tube sheet 2 thereof. The cover plate for the opening is, of course, removed during the assembly.

A detail of a connection or duct 10, which provides fluid communication between a group manifold 6 and manifolding chamber 19 is shown in Fig. 4. However, the view in Fig. 4 is rotated 180° on an axis perpendicular to the plane of the drawing from that shown in Fig. 1, to emphasize that the group manifolds may be mounted in a top tube sheet or in any other desired position, as well as in a bottom tube sheet.

Connection 10 is shown as comprising a single tubular element having threads at its lower end which cooperate with threads in the manifolding element 6. However, the connection may comprise inner and outer concentric tubular elements such as the inner conduit 10a and outer conduit 10b shown in Fig. 7. Where the concentric tubular connection is employed, insulation $S_1$ may be employed, as shown, or it may be omitted in whole or in part, as desired. Manifolding element 6 has an inner passage 12, through which fluid passes to or from the inner member of the nested conduits 5, and it has an outer passage 13, which communicates through annular openings 14 with the outer annular passageways of the same conduits. Where the modification shown in Fig. 7 is employed as for strongly exothermic reactions, for example, nested conduits 5a are of slightly different construction than conduits 5 in Fig. 4, and the annular compartment in Fig. 7, corresponding with passage 13 of Fig. 4, is completely filled with insulation. Of course, various other modifications of manifolding connections may be employed.

In assembling the grouped conduits they may be held in place for fastening, for example, by shims, then the tubular connections 10, or 10a and 10b, depending on the type of connection employed, may be screwed into place and the connection, or outer connection in the case of the concentric tubular connection, may be welded to the tube sheet. When this is completed, the shims or other supporting means may be removed, leaving the tubes free to expand or contract with changes in temperature when the converter is in operation.

While the connection 10 is shown extending somewhat above the tube sheet, it will be understood that the top of such connection may be flush with or substantially flush with the tube sheet, or the inner member may be connected with a manifolding duct, as desired, depending on the mode of manifolding employed.

The manifolding element 6 of Fig. 4 has openings 7 in the exterior surface of its outer passageway 13 to permit the venting of reactants or regeneration medium, as the case may be, into the contact mass which normally surrounds the manifold adjacent the tube sheet. Or such openings may serve to withdraw fluid from the contact mass when the manifolding element is connected to outlet or withdrawal conduits.

Figure 2:
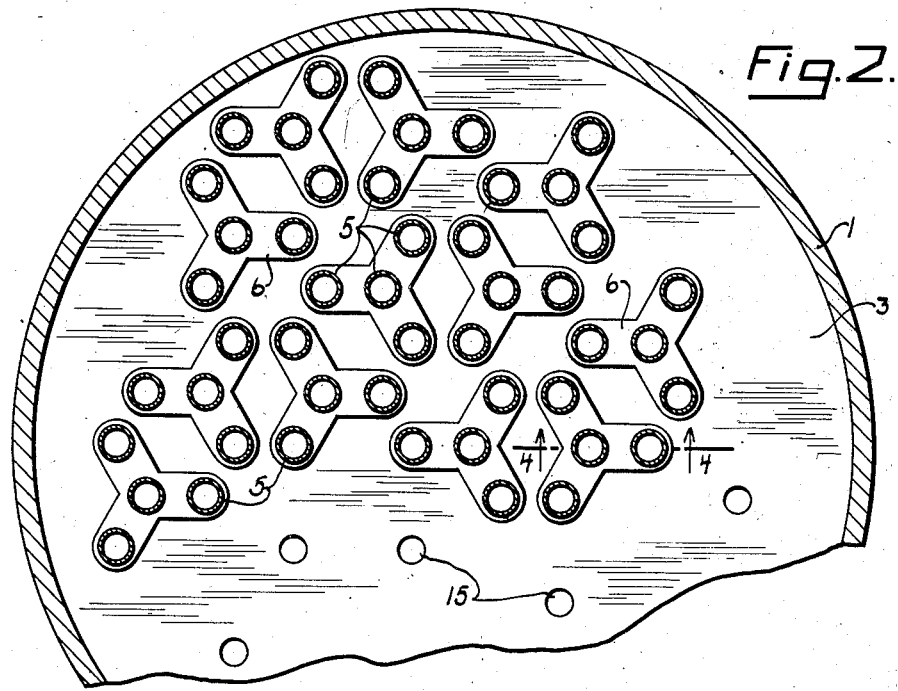
Fig. 2 is a fragmentary plan view taken on line 2—2 of Fig. 1, omitting, for the sake of clarity, the showing of the conduits which are mounted in the top tube sheet.

Fig. 2, which is a plan view taken on line 2—2 of Fig. 1, omitting the tubes fastened to the top tube sheet, shows the Y arrangement of the manifolding elements and omits some of such elements to illustrate the openings 15 in the tube sheet 3, through which the connections 10 are adapted to be inserted.

Figure 3:
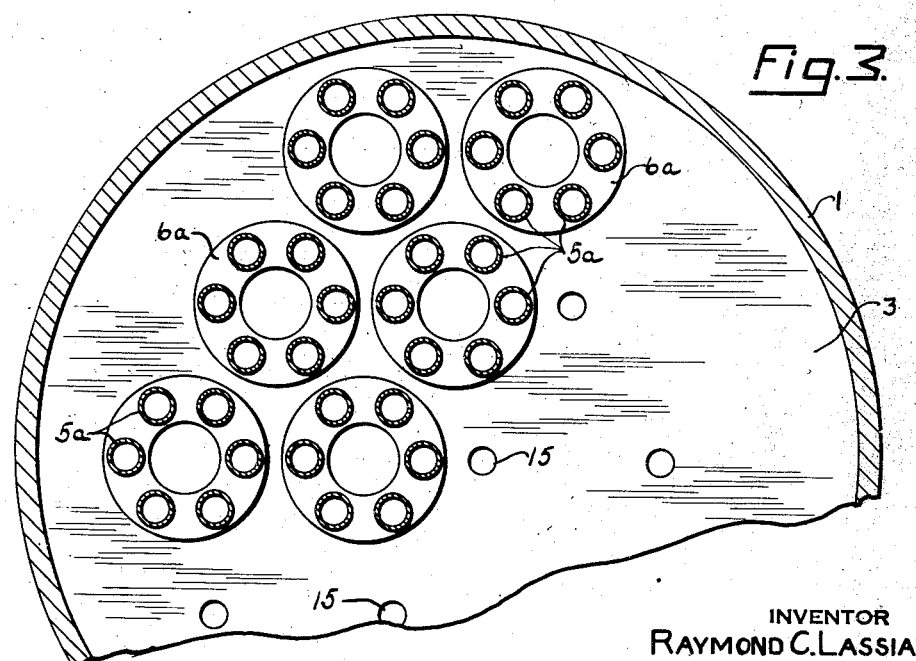
Fig. 3 is a sectional plan view of a converter similar to Fig. 2, except that a hexagonal arrangement of conduits with an annular manifold is shown in place of the Y manifold of Fig. 2.

In Fig. 3 the conduits 5a are manifolded in groups of six by manifolding elements 6a, but the pattern of the tubes is the same as that shown in Fig. 2. In some of the sections adjacent the periphery of the reaction chamber, it is best to manifold some of the conduits in groups of less than six, or individually, in order conveniently to fill out the reaction chamber or to mount them on the tube sheet.

Figure 6:
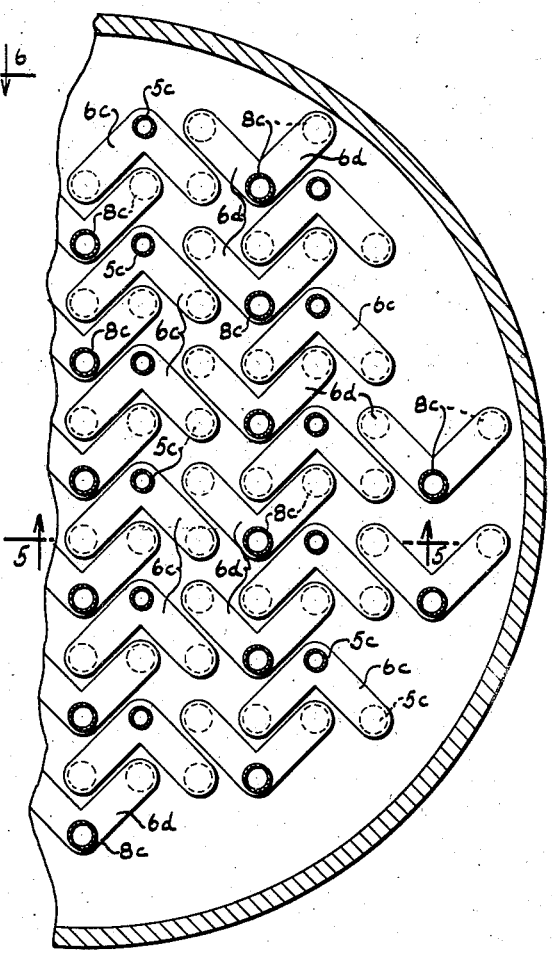
Fig. 6 is a fragmentary plan view taken on line 6—6 of Fig. 5.

In Fig. 6, the conduits are manifolded in groups of three, the configuration of each manifolded group being a right angle (L); note the inlet manifolds 6c which join blower tubes or inlet conduits 5c and outlet manifolds 6d, which connect conduits 8c, in groups.

Figure 5:
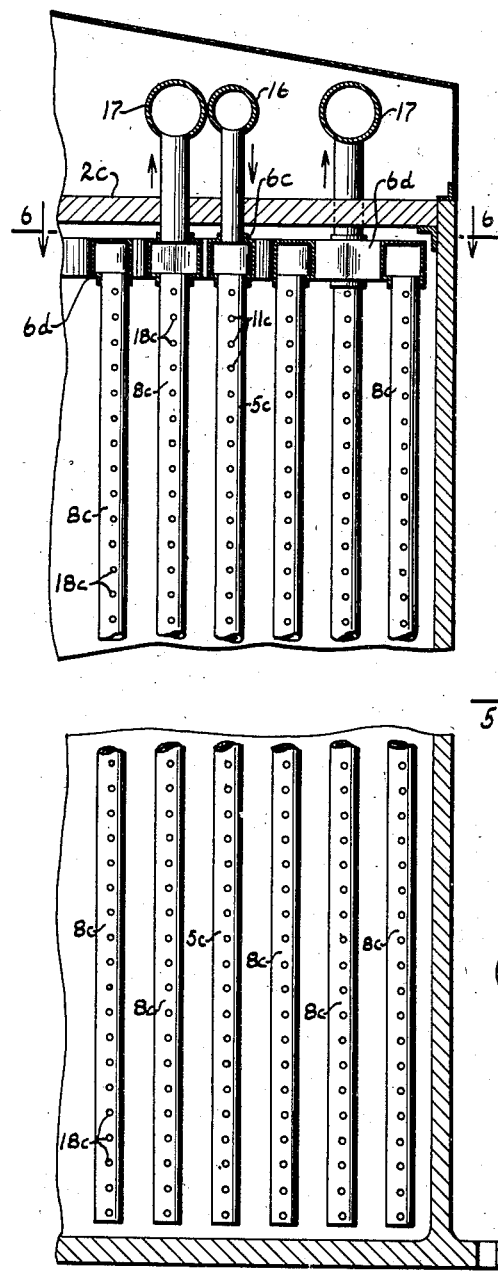
Fig. 5 is a fragmentary sectional elevation of a converter taken on line 5—5 of Fig. 6.

Fig. 5 shows all of these grouped manifolds mounted on the upper tube sheet 2c of the converter, reactants being introduced, for example, through conduits 5c, having perforations 11c, and are withdrawn, through conduits 8c having perforations 18c. Conduits 5c are shown connected to header 16 and conduits 8c to header 17.

This type of arrangement of conduits and system of manifolding, as can best be seen by reference to Fig. 6, makes it possible to introduce the manifolded groups through an opening or manhole, such as shown by and discussed in connection with Fig. 1, and to progressively assemble in place both the inlet and withdrawal conduits, starting from the periphery of the converter and working toward the opening or manhole. While both series of conduits are shown connected to the upper tube sheet in Fig. 5, it is equally contemplated that the inlet conduits may be mounted on one tube sheet and the outlet conduits on the other.

All of these systems of grouped manifolding of conduits within the reaction chamber illustrate methods whereby the number of openings in the tube sheets may be kept substantially lower than the number of conduits within the converter. This is important, particularly from two points of view: (1) It reduces substantially the problem of heat loss through the tube sheet surrounding the union with each conduit or with the connection to each conduit; and (2) it lessens to an important extent the weakening of the tube sheets, or, what amounts practically to another statement of the same proposition, it permits the use of tube sheets of lighter construction. With the number of openings required through the tube sheets so substantially reduced, it is possible to mount all of the conduits on one tube sheet if desired, as, for example, is illustrated in Fig. 5. This is something which, in the construction of durable, feasible and economical apparatus, would present a considerable problem in the absence of grouped manifolding of the tubes or conduits within the converter.

It will be understood that various other configurations of manifolding may readily be worked out, in view of the above illustrations. For example, where a square pattern of conduits is employed, the manifolds may be in the shape of crosses (+'s). Where a hexagonal pattern of conduits is desired, one series, for example, the inlet conduits, may be manifolded in groups of three by an angle manifold, the three tubes forming an angle of 120°, and the other series, or the outlet conduits, may be manifolded in groups of two. Many other plans of manifolding could, of course, be employed and all such are contemplated. Further, it is obvious that either the inlet or withdrawal conduits may be manifolded, and the other series singly mounted to a tube sheet, if desired. Again, all of the conduits may be manifolded if desired, either in the same types of groups or in different types of groups, and all may be mounted on one tube sheet or one series on either tube sheet. These and various other modifications contemplated by this invention are comprehended within the scope of the appended claims.

What I claim is:

1. Apparatus for treating fluids which comprises a casing providing a reaction chamber and a manifolding chamber adjacent one end of said reaction chamber and separated from the latter by a partition member having perforations or openings therein, a plurality of conduits arranged in substantial parallelism within said reaction chamber, and a number of fluid ducts extending through said openings in said partition, each connecting a plurality of said conduits with said manifolding chamber, so that the number of openings through said partition member is substantially less than the number of said conduits which communicate with said manifolding chamber therethrough.

2. A casing providing a reaction chamber and a manifolding chamber adjacent one end of said reaction chamber and separated from the latter by a partition member having perforations or openings therein, a plurality of perforated conduits disposed within said reaction chamber, and a number of fluid ducts extending through said openings in said partition, each connecting a plurality of said conduits with said manifolding chamber, so that the number of openings through said partition member is substantially less than the number of said conduits which communicate with the said manifolding chamber therethrough.

3. Apparatus for introducing fluid into or withdrawing it from a reaction chamber which includes a casing providing a reaction chamber and a manifolding chamber adjacent an end of said reaction chamber and separated from the latter by a partition member, a plurality of perforated conduits arranged in substantial parallelism within said reaction chamber, a plurality of manifold units located within said reaction chamber adjacent said partition member, each of said units connecting together a respective group of said conduits adjacent ends thereof, and a duct extending from each of said manifold units through openings in said partition member and adapted to provide communication between such manifold units and said manifolding chamber, the number of said openings in said partition member being substantially less than the number of said conduits.

4. A casing providing a reaction chamber and a manifolding chamber adjacent an end of said reaction chamber and separated from the latter by a partition member, a plurality of conduits disposed in substantial parallelism within said chamber, said conduits having perforations or openings along the length of each for the venting or withdrawal of fluids, ends of a group of said conduits being in the proximity of said partition member, a duct extending through said partition member, and a manifolding unit intervening between said wall and said ends of said group of conduits and joining the latter to the aforesaid duct so as to provide fluid communication between said manifolding chamber and said conduits, said manifolding unit being provided with perforations or openings in its exterior wall for distributing fluid reactants into said reaction chamber or venting fluid products of reaction therefrom.

5. Apparatus for treating a fluid which comprises a casing providing a reaction chamber and manifolding chambers, one adjacent each end of said reaction chamber and each separated from the latter by a partition member, a plurality of perforated conduits arranged in substantial parallelism within said reaction chamber and comprising a series of inlet conduits and a series of outlet conduits, the two series of conduits being located in interspersed relation, one series of said conduits being manifolded in a plurality of groups within said chamber, separate tubular manifolds being joined to the conduits of each of said groups, a single duct from each of such manifolds communicating through one of said partition members with the manifolding chamber adjacent thereto, a second series of said conduits also being manifolded in a plurality of groups within said chamber, separate tubular manifolds being connected to the conduits of each of said groups of said second series, and a duct extending from each of the last-mentioned manifolds through a second one of said partition members to provide fluid communication between the adjacent manifolding chamber and the conduits of said second series.

6. Apparatus for treating a fluid which comprises a casing providing a reaction chamber and a manifolding chamber adjacent one end of said reaction chamber and separated from the latter by a partition member having perforations or openings therethrough, a plurality of conduits arranged in substantial parallelism within said reaction chamber, one series of said conduits being manifolded in groups within said chamber, tubular manifold units, each being joined to the conduits of one of said groups, a plurality of ducts, each extending from one of said manifolding units through an opening in said partition member and providing fluid communication between the conduits of said one series and said manifolding chamber, a manifold separate from the aforesaid manifolding chamber also located near said partition member, a second series of said conduits also being manifolded in groups within said chamber, separate tubular manifold units, each being joined to conduits of one of the groups of the last mentioned series, a second plurality of ducts, and one of said ducts extending from each of the last-mentioned manifolding units through the same said partition member to provide fluid communication between the conduits of said second series and the aforesaid manifold.

7. Apparatus for treating a fluid which comprises a casing providing a reaction chamber, a plurality of conduits arranged in substantial parallelism therewithin, one series of said conduits being manifolded in groups within said chamber, a single duct from each of such manifolds communicating through a wall of said reaction chamber with a manifold chamber exterior thereto and located within said casing, and a second series of said conduits communicating singly through a wall of said chamber with a second manifolding chamber exterior thereto and located within said casing.

8. Apparatus for treating a fluid which comprises a casing providing a reaction chamber, a plurality of conduits arranged in substantial parallelism therewithin, a portion of said conduits comprising a series of inlet conduits and another portion thereof comprising a series of outlet conduits, one of said series of conduits being arranged in a hexagonal pattern and being manifolded within said chamber in a Y group arrangement, the conduits being arranged throughout the chamber so as to provide a regular and symmetrical arrangement in plan view.

9. Apparatus for treating a fluid which comprises a casing providing a reaction chamber, a plurality of conduits arranged in substantial parallelism therewithin, a portion of said conduits comprising a series of inlet conduits and another portion thereof comprising a series of outlet conduits, one of said series of conduits being arranged in a hexagonal pattern and being manifolded within said chamber in a hexagonal group arrangement, the conduits being arranged throughout the chamber so as to provide a regular and symmetrical arrangement in plan view.

10. Apparatus for treating a fluid which comprises a casing providing a reaction chamber, a plurality of conduits arranged in substantial parallelism therewithin, a portion of said conduits comprising a series of inlet conduits and another portion thereof comprising a series of outlet conduits, at least one of said series of conduits being arranged in a square pattern and being manifolded within said chamber in a right angle (L) group arrangement, the conduits being arranged throughout the chamber so as to provide a regular and symmetrical arrangement in plan view.

11. Apparatus for treating a fluid which comprises a casing providing a reaction chamber, a plurality of conduits arranged in substantial parallelism therewithin, a portion of said conduits comprising a series of inlet conduits and another portion thereof comprising a series of outlet conduits, one of said series of conduits being adapted for the introduction of fluid into said reaction chamber and another for withdrawing fluid therefrom, each of said series being arranged in a substantially square pattern in plan and being manifolded within said chamber in a right angle (L) group arrangement, the open faces of the right angles (L's) of the inlet conduits being arranged at 180° to the open faces of the right angles (L's) of the outlet conduits and the apexes of the said right angles (L's) of each series of said conduits being in straight lines, the lines of the apexes of one of said series of conduits being intermediate and parallel to the lines of the apexes of the other of said series thereof.

12. Apparatus adapted to be fastened to a manifolded group of conduits after the latter is disposed within a reaction chamber which comprises nested, relatively rotatable ducts adapted to extend through a perforation in a wall of said chamber and to be freely rotatable therein, and means adjacent the ends of each of said ducts within said chamber adapted to be joined with cooperating structure on the manifold of said group of conduits without rotation of said group of conduits, the outer member of said nested ducts being adapted to be affixed to the wall which it penetrates after the union thereof with the said manifolded group of conduits is complete.

13. A manifolding member adapted to join a plurality of double or nested conduits in a group which comprises double or nested non-communicating passageways, the inner passageway being adapted to be connected in fluid communicating relation with the inner passageway of nested conduits and also to a supply or withdrawal manifolding chamber and the outer passageway having perforations or openings in its exterior wall and being connected in fluid communicating relation with the outer passageway of the nested conduits.

RAYMOND C. LASSIAT.